(12) United States Patent
Sun

(10) Patent No.: US 12,367,861 B2
(45) Date of Patent: Jul. 22, 2025

(54) PHONEME RECOGNITION-BASED SPEECH RECOGNITION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Sining Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 332 days.

(21) Appl. No.: 17/977,496

(22) Filed: Oct. 31, 2022

(65) Prior Publication Data

US 2023/0074869 A1 Mar. 9, 2023

Related U.S. Application Data

(63) Continuation of application No. PCT/CN2021/129223, filed on Nov. 8, 2021.

(30) Foreign Application Priority Data

Dec. 23, 2020 (CN) .......................... 202011536771.4

(51) Int. Cl.
*G10L 15/02* (2006.01)
*G10L 15/16* (2006.01)
*G10L 15/187* (2013.01)

(52) U.S. Cl.
CPC .............. *G10L 15/02* (2013.01); *G10L 15/16* (2013.01); *G10L 15/187* (2013.01); *G10L 2015/025* (2013.01)

(58) Field of Classification Search
CPC ....... G10L 15/02; G10L 15/16; G10L 15/187; G10L 2015/025; G10L 15/08;
(Continued)

(56) References Cited

U.S. PATENT DOCUMENTS

2007/0198267 A1* 8/2007 Jones .................. H04M 3/4936
707/E17.062
2015/0340034 A1* 11/2015 Schalkwyk .............. G06N 3/02
704/235

(Continued)

FOREIGN PATENT DOCUMENTS

CN 105529027 A 4/2016
CN 105895081 A 8/2016
(Continued)

OTHER PUBLICATIONS

The World Intellectual Property Organization (WIPO) International Search Report for PCT/CN2021/129223 Feb. 9, 2022 08 Pages (including translation).

(Continued)

*Primary Examiner* — Michael N Opsasnick
(74) *Attorney, Agent, or Firm* — ANOVA LAW GROUP, PLLC

(57) ABSTRACT

A speech recognition method includes: performing phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output; performing suppression adjustment on a probability of the blank output in the phoneme recognition result corresponding to the speech frame, to reduce a ratio of the probability of the blank output to a probability of a phoneme in the phoneme recognition result; and inputting the adjusted phoneme recognition result (Continued)

corresponding to the speech frame into a decoding map to obtain a recognition text sequence corresponding to the speech signal, the decoding map comprising a mapping relationship between characters and phonemes.

17 Claims, 7 Drawing Sheets

(58) Field of Classification Search
CPC ..... G10L 15/183; G10L 15/20; G10L 15/063; G10L 15/26
See application file for complete search history.

(56) References Cited

U.S. PATENT DOCUMENTS

| | | | |
|---|---|---|---|
| 2016/0351188 A1* | 12/2016 | Rao | G10L 15/187 |
| 2016/0372119 A1* | 12/2016 | Sak | G10L 15/02 |
| 2018/0130474 A1 | 5/2018 | Sak et al. | |
| 2018/0254039 A1 | 9/2018 | Qian et al. | |
| 2018/0336465 A1* | 11/2018 | Kim | G06N 3/045 |
| 2019/0057685 A1 | 2/2019 | Yu et al. | |
| 2019/0139540 A1 | 5/2019 | Kanda | |
| 2020/0312306 A1 | 10/2020 | Moritz et al. | |
| 2020/0349923 A1 | 11/2020 | Hu et al. | |
| 2021/0005182 A1* | 1/2021 | Han | G10L 15/16 |
| 2021/0193123 A1 | 6/2021 | Huang et al. | |
| 2023/0074869 A1* | 3/2023 | Sun | G10L 15/16 |

FOREIGN PATENT DOCUMENTS

| | | |
|---|---|---|
| CN | 108269568 A | 7/2018 |
| CN | 108389575 A | 8/2018 |
| CN | 109559735 A | 4/2019 |
| CN | 110164421 A | 8/2019 |
| CN | 113539242 A | 10/2021 |
| JP | 2017219769 A | 12/2017 |
| WO | 2020195068 A1 | 10/2020 |

OTHER PUBLICATIONS

Alex Graves., "Sequence transduction with recurrent neural networks", Nov. 14, 2012.

L.R Rabiner., "An Introduction to Hidden Markov Models", Jan. 1986, ieee assp magazine.

Zhang, Shiliang, et al. "Deep-fsmn for large vocabulary continuous speech recognition." 2018, 2018 IEEE International Conference on Acoustics, Speech and Signal Processing (ICASSP). IEEE.

Zhang, Shiliang, et al. "Compact Feedforward Sequential Memory Networks for Large Vocabulary Continuous Speech Recognition." 2016, Interspeech.

Miao Yajie et al., "EESEN: End-to-end speech recognition using deep RNN models and WFST-based decoding." 2015, 2015 IEEE Workshop on Automatic Speech Recognition and Understanding (ASRU). IEEE.

Hori, Takaaki et al., "Speech recognition algorithms using weighted finite-state transducers." , 2013, p. 1-162.Synthesis Lectures on Speech and Audio Processing 9.1.

The European Patent Office (EPO) the Extended European Search Report for 21908894.5, Apr. 29, 2024 13 Pages.

Haşim Sak et al. "Learning acoustic frame labeling for speech recognition with recurrent neural networks." 2015 IEEE international conference on acoustics, speech and signal processing (ICASSP). IEEE, 2015.

Branislav Popovic et al., "End-to-end large vocabulary speech recognition for the Serbian language." Aug. 13, 2017 (Aug. 13, 2017), SAT 2015 18th Tnternational Conference, Austin, TX, USA, Sep. 24-27, 2015; [Lecture Notes in Computer Science; Lect Notes Computer], Springer, Berlin, Heidelberg, pp. 343-352.

The Japan Patent Office (JPO) Notification of Reasons for Refusal for Application No. 2023-518016 and Translation Apr. 8, 2024 13 Pages.

Qi Liu et al. "Modular end-to-end automatic speech recognition framework for acoustic-to-word model." IEEE/ACM Transactions on Audio, Speech, and Language Processing 28 (2020): 2174-2183.

* cited by examiner

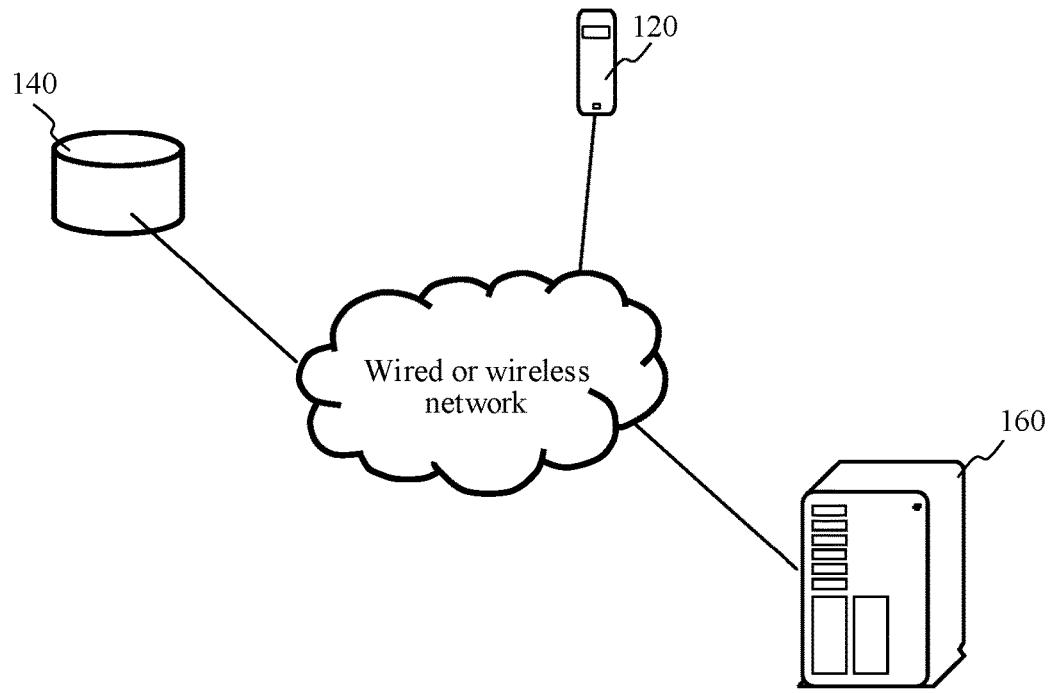

FIG. 1

| Perform phoneme recognition on a speech signal to obtain a phoneme recognition result corresponding to a speech frame in the speech signal, the phoneme recognition result indicating a probability distribution of the corresponding speech frame in a phoneme space, the phoneme space containing a plurality of phonemes and an blank output, and the acoustic model being trained and obtained based on a speech signal sample and actual phonemes of speech frames in the speech signal sample | 21 |

| Perform suppression adjustment on a probability of the blank output in the phoneme recognition result corresponding to the speech frame, so as to reduce a ratio of the probability of the blank output to a probability of a phoneme in the phoneme recognition result | 22 |

| Input the adjusted phoneme recognition result corresponding to the speech frame into a decoding map to obtain a recognition text sequence corresponding to the speech signal, the decoding map including a mapping relationship between characters and phonemes | 23 |

FIG. 2

PHONEME RECOGNITION-BASED SPEECH RECOGNITION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2021/129223, entitled "SPEECH RECOGNITION METHOD AND APPARATUS, COMPUTER DEVICE, AND STORAGE MEDIUM" and filed on Nov. 8, 2021, which claims priority to Chinese Patent Application No. 202011536771.4, filed with the National Intellectual Property Administration, PRC on Dec. 23, 2020 and entitled "SPEECH RECOGNITION METHOD AND APPARATUS, COMPUTER DEVICE, AND STORAGE MEDIUM", the entire contents of both of which are incorporated herein by reference.

FIELD OF THE TECHNOLOGY

The present disclosure relates to the field of speech recognition technologies, and in particular, to a speech recognition method and apparatus, a computer device, and a storage medium.

BACKGROUND OF THE DISCLOSURE

Speech recognition is a technology that recognizes a speech as a text, which is widely used in various artificial intelligence (AI) scenarios.

A speech recognition framework generally includes an acoustic model part and a decoding part. The acoustic model part is used to recognize a phoneme of each speech frame in an inputted speech signal, and the decoding part outputs a text sequence of the speech signal by the recognized phoneme of each speech frame. In related art, implementing an acoustic model through a recurrent neural network transducer (RNN-T) is one of the focuses of research in the industry.

The RNN-T model introduces the concept of blank output in a phoneme recognition process, that is, it predicts that a certain speech frame does not include valid phonemes. However, the introduction of blank output may lead to an increase of the error rate in a subsequent decoding process in some application scenarios, especially leading to an increase of deletion errors, which affects the accuracy of speech recognition.

SUMMARY

According to various embodiments of the present disclosure, a speech recognition method and apparatus, a computer device, and a storage medium are provided.

A speech recognition method, executed by a computer device, the method including: performing phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output; performing suppression adjustment on a probability of the blank output in the phoneme recognition result corresponding to the speech frame, to reduce a ratio of the probability of the blank output to a probability of a phoneme in the phoneme recognition result; and inputting the adjusted phoneme recognition result corresponding to the speech frame into a decoding map to obtain a recognition text sequence corresponding to the speech signal, the decoding map comprising a mapping relationship between characters and phonemes.

A speech recognition apparatus, including: a speech signal processing module, configured to perform phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output; a probability adjustment module, configured to perform suppression adjustment on a probability of the blank output in the phoneme recognition result corresponding to the speech frame, to reduce a ratio of the probability of the blank output to a probability of a phoneme in the phoneme recognition result; and a decoding module, configured to input the adjusted phoneme recognition result corresponding to the speech frame into a decoding map to obtain a recognition text sequence corresponding to the speech signal, the decoding map including a mapping relationship between characters and phonemes.

A speech recognition method, including: acquiring a speech signal, the speech signal including speech frames obtained by segmentation of an original speech; performing phoneme recognition on the speech signal to obtain a phoneme recognition result corresponding to each speech frame, the phoneme recognition result indicating a probability distribution of the corresponding speech frame in a phoneme space, and the phoneme space including each phoneme and a blank output; and inputting, into a decoding map, the phoneme recognition result in which the probability of the blank output satisfies a specified condition in the phoneme recognition results corresponding to the respective speech frames, to obtain a recognition text sequence corresponding to the speech signal, the decoding map including a mapping relationship between characters and phonemes.

A computer device, including a processor and a memory, the memory storing at least one computer instruction, and the at least one computer instruction being loaded and executed by the processor to implement the above speech recognition method.

A non-transitory computer-readable storage medium, storing at least one computer instruction, the at least one computer instruction being loaded and executed by a processor to implement the above speech recognition method.

A computer program product or a computer program, including computer instructions, the computer instructions being stored in a computer-readable storage medium. A processor of a computer device reads the computer instructions from the computer-readable storage medium, and the processor executes the computer instructions, causing the computer device to perform the above speech recognition method.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other accompanying drawings according to the accompanying drawings without creative efforts.

FIG. 1 is a system configuration diagram of a speech recognition system according to each embodiment of the present disclosure.

FIG. 2 is a schematic flowchart of a speech recognition method according to an exemplary embodiment.

DESCRIPTION OF EMBODIMENTS

Figure 3:
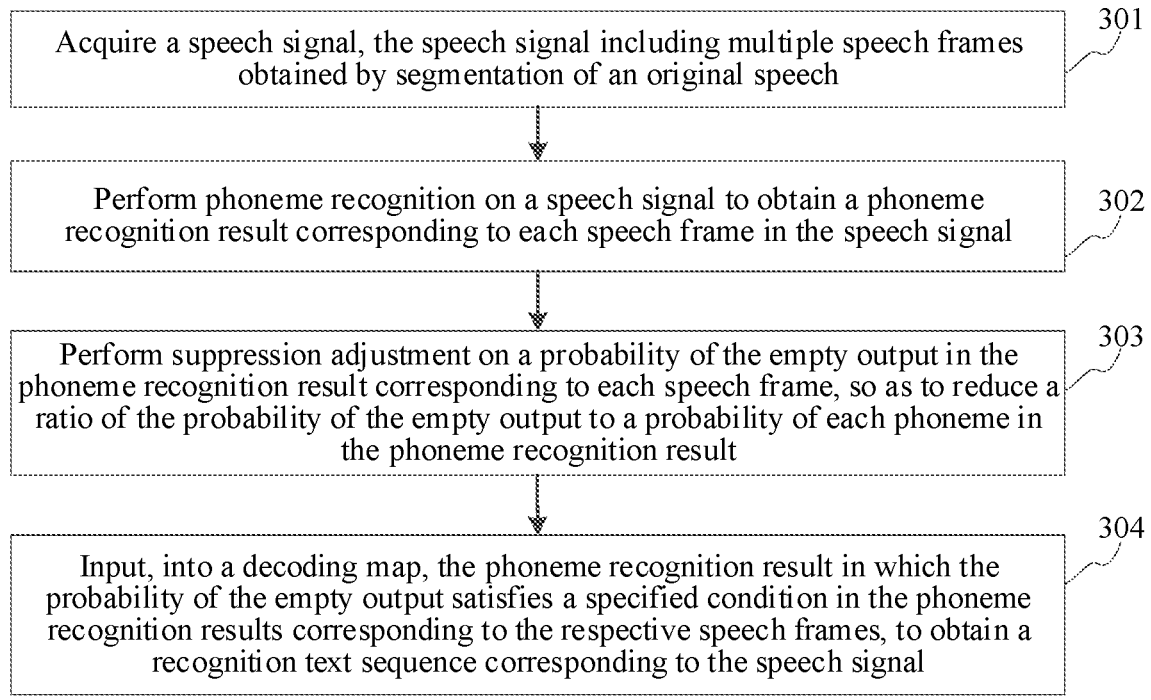
FIG. 3 is a schematic flowchart of a speech recognition method according to an exemplary embodiment.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. Implementations described in the following exemplary embodiments do not represent all implementations that are consistent with the present disclosure. On the contrary, the implementations are merely examples of apparatuses and methods that are described in detail in the appended claims and that are consistent with some aspects of the present disclosure.

Before describing the embodiments shown in the present disclosure, several concepts in the present disclosure are first introduced.

1) Artificial Intelligence (AI)

AI is a theory, method, technology and application system that uses digital computers or machines controlled by the digital computers to simulate, extend and expand human intelligence, perceive the environment, acquire knowledge, and use the knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, to enable the machines to have functions of perception, reasoning, and decision-making.

An AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning.

2) Speech Technology (ST)

Key technologies of the speech technology include an automatic speech recognition (ASR) technology, a text to speech (TTS) technology, and a voiceprint recognition technology. To make a computer capable of listening, seeing, speaking, and feeling is a future development direction of human-computer interaction, and speech has become one of the most promising human-computer interaction methods in the future.

3) Machine Learning (ML)

ML is a multi-field interdiscipline, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

The solutions according to embodiments of the present disclosure are applied to scenarios such as the speech technology and the machine learning technology involving artificial intelligence to accurately recognize a user speech as a corresponding text.

With reference to FIG. 1, FIG. 1 shows a system configuration diagram of a speech recognition system according to each embodiment of the present disclosure. As shown in FIG. 1, the system includes a sound collection component 120, and a speech recognition device 140.

The sound collection component 120 is connected to the speech recognition device 140 in a wired or wireless manner.

The sound collection component 120 may be implemented as a microphone, an array of microphones, or a pickup, or the like. The sound collection component 120 is configured to collect speech data while a user is speaking.

The speech recognition device 140 is configured to recognize the speech data collected by the sound collection component 120 to obtain a recognized text sequence.

In some embodiments, the speech recognition device 140 may further perform natural semantic processing on the recognized text sequence to respond to the user speech.

The sound collection component 120 and the speech recognition device 140 may be implemented as two independent hardware devices. For example, the sound collection component 120 is a microphone disposed on a steering wheel of a vehicle, and the speech recognition device 140 may be an in-vehicle smart device; alternatively, the sound collection component 120 is a microphone disposed on a remote control, and the speech recognition device 140 may be a smart home device (such as a smart TV, a set-top box, and an air conditioner) controlled by the remote control.

Alternatively, the sound collection component 120 and the speech recognition device 140 may be implemented as a same hardware device. For example, the speech recognition device 140 may be a smart device such as a smart phone, a tablet computer, a smart watch and smart glasses, while the sound collection component 120 may be a microphone built into the speech recognition device 140.

In some embodiments, the speech recognition system may further include a server 160.

The server 160 may be configured to deploy and update a speech recognition model in the speech recognition device 140. Alternatively, the server 160 may also provide a cloud speech recognition service to the speech recognition device 140, that is, the server 160 receives speech data sent by the speech recognition device 140, and returns a recognition result to the speech recognition device 140 after speech recognition of the speech data. Alternatively, the server 160 may also cooperate with the speech recognition device 140 to complete operations such as recognition of the speech data and response to the speech data.

The server 160 is one or more servers, a virtualization platform, or a cloud computing service center.

The server may be an independent physical server, a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The server 160 is connected to the speech recognition device 140 through a communication network. In some embodiments, the communication network is a wired network or a wireless network.

In some embodiments, the system may further include a management device (not shown in FIG. 1). The management device is connected to the server 160 through a communication network. In some embodiments, the communication network is a wired network or a wireless network.

In some embodiments, the wireless network or the wired network uses a standard communication technology and/or protocol. The network is generally the Internet, but may also be any network, including but not limited to, any combination of a local area network (LAN), a metropolitan area network (MAN), a wide area network (WAN), a mobile, wired, or wireless network, a dedicated network, or a virtual private network. In some embodiments, technologies and/or formats such as a hyper text mark-up language (HTML) and an extensible markup language (XML) are used to represent data exchanged through a network. In addition, encryption technologies such as a secure socket layer (SSL), transport layer security (TLS), a virtual private network (VPN), and internet protocol security (Ipsec) may further be used to encrypt all or some links. In some other embodiments, custom and/or dedicated data communication technologies may further be used in place of or in addition to the above data communication technologies.

With reference to FIG. 2, which shows a schematic flowchart of a speech recognition method, the speech recognition method may be executed by a computer device. The computer device may be the speech recognition device 140 or the server 160 in the system shown in FIG. 1 above, or the computer device may include both the speech recognition device 140 and the server 160 in the system shown in FIG. 1 above. As shown in FIG. 2, the speech recognition method may include the following steps:

Step 21: Perform phoneme recognition on a speech signal to obtain a phoneme recognition result corresponding to a speech frame in the speech signal. The phoneme recognition result is used to indicate a probability distribution of the corresponding speech frame in a phoneme space. The phoneme space includes a plurality of phonemes and a blank output. In some embodiments, the speech signal includes multiple speech frames, and each speech frame has a corresponding phoneme recognition result.

The phoneme recognition result may be a result obtained by performing phoneme recognition on the speech signal through an acoustic model. The acoustic model is trained and obtained based on a speech signal sample and actual phonemes of speech frames in the speech signal sample.

Phoneme (phone): a minimum phonetic unit obtained by division according to natural properties of a speech. Based on an analysis according to a pronunciation action in a syllable, an action constitutes a phoneme. The phonemes are divided into vowels and consonants. For example, a Chinese syllable ā (pronunciation) includes one phoneme, ài (pronunciation) includes two phonemes, and dài (pronunciation) includes three phonemes.

The phoneme is a minimum unit that constitutes a syllable or a minimum segment of a speech, and is a minimum linear phonetic unit obtained by division from the perspective of sound quality. The phoneme is physical phenomena that exists concretely. Phonetic symbols of the International Phonetic Alphabet (formulated by the International Phonetic Association and used to unify national phonetic alphabets, and also referred to as "International Phonetic Alphabet" and "Universal Phonetic Alphabet") correspond one-to-one to phonemes of all human languages.

A quantity of blank outputs included in the phoneme space may be greater than or equal to 1, such as including a blank output.

In an embodiment of the present disclosure, for each speech frame in the speech signal, the acoustic model may recognize a phoneme corresponding to the speech frame, and obtain a probability that the phoneme of the speech frame belongs to each preset phoneme and a probability of the blank output.

For example, in some embodiments, the phoneme space includes 212 types of phonemes and a blank output (indicating that the corresponding speech frame has no user pronunciation), that is, for an inputted speech frame, the acoustic model according to the embodiment of the present disclosure can output a probability that the speech frame respectively corresponds to 212 types of phonemes and the blank output.

Step 22: Perform suppression adjustment on a probability of the blank output in the phoneme recognition result corresponding to the speech frame, so as to reduce a ratio of the probability of the blank output to a probability of a phoneme in the phoneme recognition result. In some embodiments, the suppression adjustment may be performed for one or more speech frames of the speech signal. In some embodiments, for one speech frame, a ratio of the probability of the blank output to probabilities of one or phonemes in the phoneme recognition result may be reduced respectively.

Step 23: Input the adjusted phoneme recognition result corresponding to the speech frame into a decoding map to obtain a recognition text sequence corresponding to the speech signal. In some embodiments, the adjusted phoneme recognition results corresponding to multiple speech frames of the speech signal are input to the decoding map to obtain the recognition text.

The decoding map is used to determine the phoneme corresponding to the speech frame based on the phoneme recognition result. The decoding map may include a mapping relationship between characters and phonemes, and a character may be a Chinese character or a word.

In an embodiment of the present disclosure, after the phoneme recognition result is inputted to the decoding map, it is determined that the phoneme recognition result corresponds to a certain phoneme or a blank output based on the decoding map according to the probabilities of each phoneme and the blank output in the phoneme space in the phoneme recognition result, and a corresponding text is determined according to the determined phoneme. If the phoneme recognition result corresponds to the blank output, it is determined that the speech frame corresponding to the phoneme recognition result does not include a user pronunciation, that is, there is no corresponding text.

The speech frame in the speech signal may be each speech frame obtained by segmentation of an original speech collected by the sound collection component. The respective speech frames in the speech signal are arranged in an orderly manner, for example, the speech frame may be arranged according to a position of the speech frame in the original speech. For example, the more the speech frame is in the front of the original speech, the more the speech frame is in the front of the speech signal. The respective speech frames in the speech signal are arranged in sequence, and the text of each speech frame obtained by the decoding map is arranged according to the position of the speech frame in the speech signal, so as to obtain a recognition text sequence.

Since the phoneme recognition result includes the blank output, a recognition error rate may increase. For example, there may be a case that a speech frame having a pronunciation is mistakenly recognized as a blank output (this case is also referred to as a deletion error), thereby affecting the accuracy of speech recognition. For this, in the solution according to the embodiment of the present disclosure, after the acoustic model outputs the phoneme recognition result, the probability of the blank output in the phoneme recognition result is suppressed. As the suppression of the probability of the blank output in the phoneme recognition result, the possibility that the phoneme recognition result is recognized as a phoneme also increases, thereby effectively reducing the case that the speech frame having a pronunciation is mistakenly recognized as a blank output.

In summary, in the solution according to the embodiment of the present disclosure, for the phoneme recognition result including the probability distribution of the speech frame on each phoneme and the blank output, before the phoneme recognition result is inputted into the decoding map, the probability of the blank output in the phoneme recognition result is first suppressed to reduce a probability that the speech frame is recognized as the blank output, thereby reducing the possibility that the speech frame is mistakenly recognized as the blank output, that is, reducing the deletion error of the model, thereby improving the recognition accuracy of the model.

With reference to FIG. 3, which shows a schematic flowchart of a speech recognition method, the speech recognition method may be executed by a computer device. For example, the computer device may be the speech recognition device 140 or the server 160 in the system shown in FIG. 1 above, or the computer device may include both the speech recognition device 140 and the server 160 in the system shown in FIG. 1 above. As shown in FIG. 3, the speech recognition method may include the following steps:

Step 301: Acquire a speech signal, the speech signal including multiple speech frames obtained by segmentation of an original speech.

In an embodiment of the present disclosure, after the sound collection component collects an original speech during a user speaking process, the collected original speech is sent to the computer device, for example, to the speech recognition device. The speech recognition device segments the original speech to obtain several speech frames.

In some embodiments, the speech recognition device may segment the original speech into short-time speech segments with overlaps. For example, generally for a speech with a sampling rate of 16 K, a length of a frame of speech after segmentation is 25 ms, and an overlap between frames is 15 ms, and this process is also referred to as "framing".

Step 302: Perform phoneme recognition on a speech signal to obtain a phoneme recognition result corresponding to each speech frame in the speech signal.

The phoneme recognition result is used to indicate a probability distribution of the corresponding speech frame in a phoneme space. The phoneme space includes each phoneme and a blank output. The acoustic model is trained and obtained by a speech signal sample and an actual phoneme of each speech frame in the speech signal sample.

In an embodiment of the present disclosure, the acoustic model is an end-to-end machine learning model, input data of the acoustic model includes the speech frame in the speech signal (for example, the input includes a feature vector of the speech frame), and output data is a predicted distribution probability of phonemes of the speech frame in the phoneme space, that is, a phoneme recognition result.

For example, the phoneme recognition result may be represented as a probability vector as follows:

$$(p_0, p_1, p_2, \ldots p_{212})$$

In the probability vector, $p_0$ represents a probability that the speech frame is a blank output, $p_1$ represents a probability that the speech frame corresponds to a first type of phoneme, and 212 phonemes are included in the entire phoneme space, plus a blank output.

In some embodiments, the performing phoneme recognition on a speech signal to obtain a phoneme recognition result corresponding to each speech frame in the speech signal includes:

performing a feature extraction on a target speech frame by a trained acoustic model to obtain a feature vector of the target speech frame, the target speech frame being any one of the respective speech frames;

inputting the target speech frame into an encoder in the acoustic model to obtain an acoustic hidden layer representation vector of the target speech frame;

inputting phoneme information of a historical recognition text of the target speech frame into a predictor in the acoustic model to obtain a text hidden layer representation vector of the target speech frame, the historical recognition text of the target speech frame being a text obtained by recognizing phoneme recognition results of first n non-blank output speech frames of the target speech frame by the decoding map, and n being an integer greater than or equal to 1; and inputting the acoustic hidden layer representation vector of the target speech frame and the text hidden layer representation vector of the target speech frame into a joint network to obtain the phoneme recognition result of the target speech frame.

In an embodiment of the present disclosure, the acoustic model may be implemented by a transducer model. The transducer model is described as follows:

Given input sequence:

$$x=(x_1, x_2, \ldots, x_T) \varepsilon X^*$$

and output sequence:

$$y=(y_1 y_2, \ldots y_u) \varepsilon \mathcal{Y}^*$$

Where, $X^*$ represents a collection of all input sequences, $\mathcal{Y}^*$ represents a collection of all output sequences, both $x_t \in X$ and $y_u \in \mathcal{Y}$ are real number vectors, X and $\mathcal{Y}$ respectively represent an input space and an output space. For example, in this solution, the transducer model is used for phoneme recognition, the input sequence x is a feature vector sequence, such as a filter bank (FBank) feature, or a Mel frequency cepstrum coefficient (MFCC) feature, and $x_t$ represents a feature vector at a t moment; the output sequence y is a phoneme sequence, and $y_u$ represents a phoneme of a u-th step.

An extended output space $\bar{\mathcal{Y}} = \mathcal{Y} \cup \emptyset$ is defined, and $\emptyset$ represents a blank output symbol, which means that the model has no output. After introduction of the blank output symbol, a sequence $(y_1, \emptyset, \emptyset, y_2, \emptyset, \emptyset, y_3) \in \bar{\mathcal{Y}}^*$ is equivalent to $(y_1, y_2, y_3) \in \mathcal{Y}^*$. In this solution, because of the introduction of the blank output, the output sequence and the input sequence have a same length, so an element $a \in \mathcal{Y}^*$ in the collection $\bar{\mathcal{Y}}^*$ is also referred to as "alignment". An arbitrary input sequence is given, the transducer model defines a condition distribution $\Pr(a \in \bar{\mathcal{Y}}^* | x)$, and the condition distribution is used to calculate a probability of the output sequence y after the given input sequence x:

$$\Pr(y \in \mathcal{Y}^* | x) = \sum_{a \in \mathcal{B}^{-1}(y)} \Pr(a|x) \quad (1)$$

Figure 4:
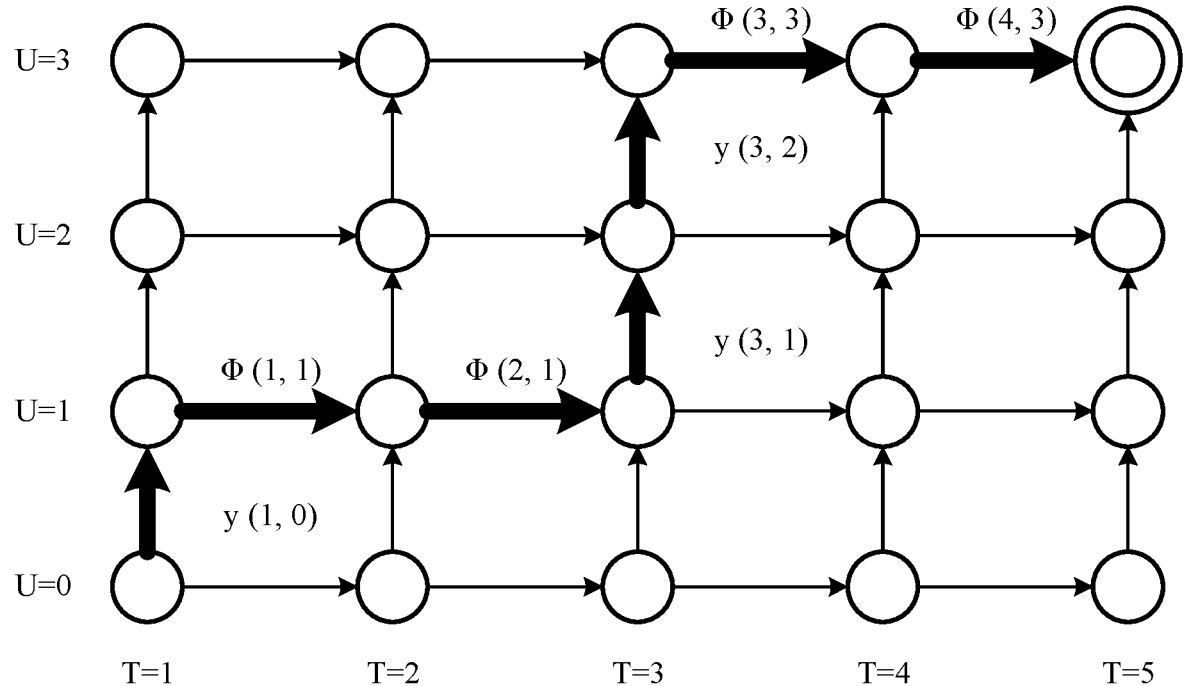
FIG. 4 is a schematic diagram of an alignment process according to the embodiment shown in FIG. 3.

Where, $\mathcal{B}: \bar{\mathcal{Y}}^* \to \mathcal{Y}^*$ represents the removal of a blank output in an alignment sequence, and $\mathcal{B}^{-1}: \mathcal{Y}^* \to \bar{\mathcal{Y}}^*$ represents the addition of a blank output to the output sequence to form an alignment sequence. It can be seen from formula (1) that in order to calculate the probability of the output sequence y, it is necessary to sum up all possible condition probabilities of the alignment a corresponding to the sequence y. With reference to FIG. 4, FIG. 4 shows a schematic diagram of an alignment process according to an embodiment of the present disclosure. FIG. 4 gives an example to illustrate formula (1).

In FIG. 4, U=3, T=5, all possible paths from a bottom left corner to a top right corner are alignments. A bold arrow indicates one of the possible paths, and a non-empty symbol (phoneme) is outputted when the model moves forward along a longitudinal direction; an empty symbol (that is, the blank output) is outputted when the model moves forward along a horizontal direction, indicating that no output is generated. At the same moment, the model allows a plurality of outputs to be generated.

Figure 5:
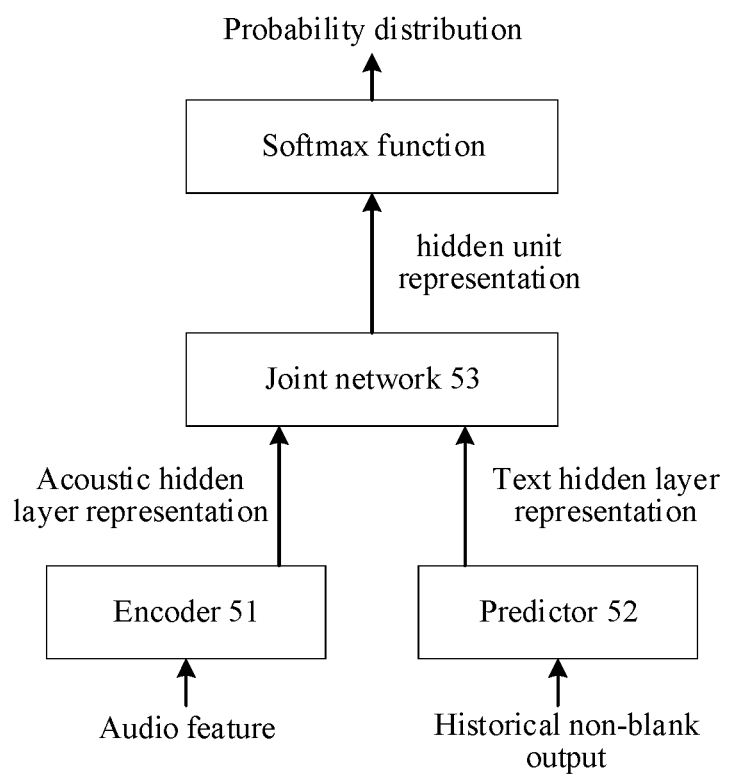
FIG. 5 is a schematic structural diagram of an acoustic model according to the embodiment shown in FIG. 3.

In order to model $\Pr(a \in \bar{\mathcal{Y}}^* | x)$, three subnets are generally used for joint modeling. With reference to FIG. 5, FIG. 5 shows a schematic structural diagram of an acoustic model according to an embodiment of the present disclosure. As shown in FIG. 5, the acoustic model includes an encoder 51, a predictor 52, and a joint network 53.

The encoder 51 may be a recurrent neural network, such as a long short-term memory (LSTM) network, which accepts an audio feature input at the t moment and outputs an acoustic hidden layer representation $h_t^{enc}$.

The predictor 52 may be a recurrent neural network, such as the LSTM, which accepts a historical non-blank output label $y_{u_{i-1}}$ of the model, and outputs the accepted label as a text hidden layer representation $h_{u_i}^{pre}$.

The joint network 53 may be a fully-connected neural network, such as a linear layer plus an activation unit, which is used to sum $h_t^{enc}$ and $h_{u_i}^{pre}$ after a linear transformation, and output a hidden unit representation $z_i$. Finally, through a softmax function, the representation is transformed into a probability distribution.

In FIG. 5 above, $\hat{y}_i \in \bar{\mathcal{Y}}$, and the alignment $a = (\hat{y}_1, \hat{y}_2, \ldots, \hat{y}_{T+U})$, eventually, the calculation of formula (1) is:

$$\Pr(y \in \mathcal{Y}^* | x) = \sum_{a \in \mathcal{B}^{-1}(y)} \Pr(a|x) = \Pi_{i=1}^{t=u} \Pr(\hat{y}_i | x_1, \ldots, x_t, y_0, \ldots, y_{u_{i-1}}) \quad (2)$$

The calculation of formula (2) requires traversal and calculation of all possible alignment paths. The direct use of this algorithm leads to a large quantity of calculations. During a process of model training, a forward and backward algorithm may be used to perform probability calculation of formula (2).

In some embodiments, the encoder is a feedforward sequential memory network (FSMN).

In some embodiments, the predictor is a one-dimensional convolutional network.

The solution shown in an embodiment of the present disclosure may be applied to scenarios with a limited computing power such as an in-vehicle off-line speech recognition system. An in-vehicle device has high requirements for quantities of model parameters and calculations, and a central processing unit (CPU) has a limited computing power. Therefore, requirements for the quantity of model parameters and for a model structure are relatively high. In order to reduce the quantity of calculations and adapt to such application scenarios with a limited computing power, the solution shown in the present disclosure adopts the all-forward neural network FSMN as an encoder of the model, and uses the one-dimensional convolutional network instead of the commonly used long short-term memory LSTM as a predictor.

In the above transducer model, in order to depict historical information of the model, encoder and predictor networks generally use a recurrent neural network (RNN) structure, such as the LSTM or a gated recurrent unit (GRU). However, for an embedded device with limited computing resources, the recurrent neural network may bring a large quantity of calculations and occupation of a large quantity of CPU resources. On the other hand, the contents recognized by an in-vehicle off-line speech are mainly query and control instructions. The sentences are relatively short and do not require excessively long historical information. For this, this solution uses a FSMN-based encoder network and a one-dimensional convolution-based predictor network. On the one hand, the model parameters may be compressed, and on the other hand, the computing resources may be greatly saved, a computing speed may be improved, and real-time speech recognition may be ensured.

In this solution, a FSMN-based encoder structure is used. The FSMN network is applied to large vocabulary speech recognition tasks. The FSMN structure used in this solution may be a structure with a projection layer and residual connections.

Figure 6:
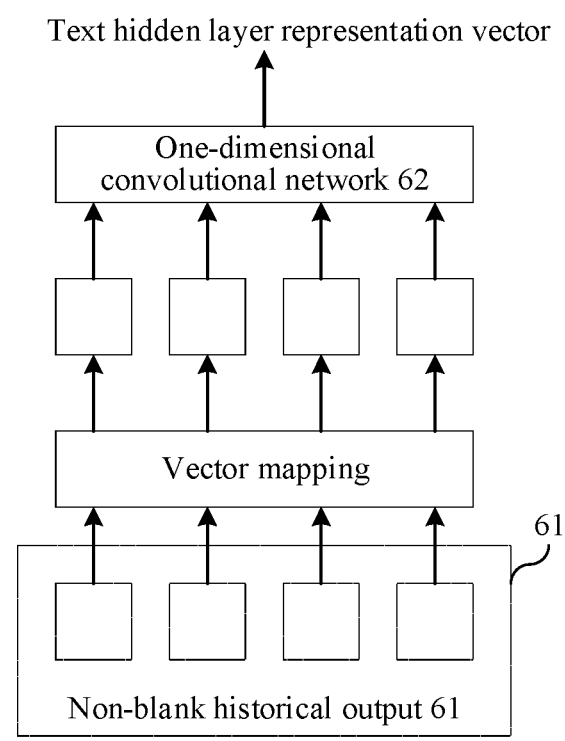
FIG. 6 is a network structure diagram of a predictor according to the embodiment shown in FIG. 3.

For the predictor network, the one-dimensional convolutional network is used in this solution to generate a current output according to limited historical predicted outputs. With reference to FIG. 6, FIG. 6 is a network structure diagram of a predictor according to an embodiment of the present disclosure. As shown in FIG. 6, the predictor network uses four non-empty historical outputs to predict a current output frame. That is, four non-empty historical outputs 61 corresponding to the current input are subjected to vector mapping to be inputted into a one-dimensional convolutional network 62 to obtain a text hidden layer representation vector.

In an embodiment of the present disclosure, the acoustic model may be trained and obtained by a preset speech signal sample, and an actual phoneme of each speech frame in the speech signal sample. For example, in a training process, a speech frame in the speech sample is inputted to the FSMN-based encoder network in the acoustic model, and actual phonemes of first four non-empty speech frames of the speech frame (when there is no historical non-empty speech frame at a start moment of the training, or when the historical non-empty speech frame is insufficient, the actual phoneme may be replaced by a preset phoneme) are inputted to the one-dimensional convolution-based predictor network. In a process of processing input data by the acoustic model, parameters of three parts (the encoder, the predictor, and the joint network) in the acoustic model are updated, so that a sum of probabilities on all possible alignment paths, that is, a result of the above formula (2), is maximized, thereby implementing the training of the acoustic model.

Step 303: Perform suppression adjustment on a probability of the blank output in the phoneme recognition result corresponding to each speech frame, so as to reduce a ratio of the probability of the blank output to a probability of each phoneme in the phoneme recognition result.

In some embodiments, the performing suppression adjustment on a probability of the blank output in the phoneme recognition result corresponding to each speech frame includes:

adjusting the phoneme recognition result corresponding to each speech frame by at least one of the following adjustment methods:
reducing the probability of the blank output in the phoneme recognition result corresponding to each speech frame; and
increasing the probability of each phoneme in the phoneme recognition result corresponding to each speech frame.

In some embodiments, the reducing the probability of the blank output in the phoneme recognition result corresponding to each speech frame includes:
multiplying the probability of the blank output in the phoneme recognition result corresponding to each speech frame by a first weight, the first weight being less than 1 and greater than 0.

In an embodiment of the present disclosure, to suppress the probability of the blank output in the phoneme recognition result, it is possible to only reduce the probability of the blank output in the phoneme recognition result, for example, to multiply the probability of the blank output in the phoneme recognition result by a number between 0 and 1. In this way, when the probability of each phoneme in the phoneme recognition result remains unchanged, the ratio between the probability of the blank output and the probability of each phoneme can be reduced.

In some embodiments, the reducing the probability of the blank output in the phoneme recognition result corresponding to each speech frame includes:
multiplying the probability of each phoneme in the phoneme recognition result corresponding to each speech frame by a second weight, the second weight being greater than 1.

In an embodiment of the present disclosure, to suppress the probability of the blank output in the phoneme recognition result, it is possible to only increase the probability of each phoneme in the phoneme recognition result, for example, to multiply the probability of each phoneme in the phoneme recognition result by a number greater than 1. In this way, when the probability of the blank output in the phoneme recognition result remains unchanged, the ratio between the probability of the blank output and the probability of each phoneme can be reduced.

In another exemplary solution, a computer device may also increase the probability of each phoneme in the phoneme recognition result while reducing the probability of the blank output in the phoneme recognition result. For example, to multiply the probability of the blank output in the phoneme recognition result by a number between 0 and 1, while multiplying the probability of each phoneme in the phoneme recognition result by a number greater than 1.

In this solution, in the acoustic model, in order to obtain the alignment before the input and output, it is necessary to insert a blank output symbol, which is Ø, into an inputted phoneme sequence. The symbol Ø, like other phonemes, is predicted using the model. Assuming that a total quantity of non-empty phonemes is P, an output dimension of the final model is P+1, usually a 0-th dimension represents the blank output Ø. According to the experiment, it is known that the introduction of the blank output greatly improves deletion errors of the model, which indicates that a large quantity of phonemes are mistakenly recognized as the blank output. In order to solve the problem of a high probability of the blank output, the present disclosure reduces the generation of deletion errors by adjusting a probability weight of the blank output during a decoding process of the transducer.

Take the multiplying the probability of the blank output in the phoneme recognition result corresponding to each speech frame by the first weight as an example, assuming that the probability of the blank output is Pr(Ø), in order to reduce the probability of the blank output, this solution divides an original blank output probability value by a weight a greater than 1, $\alpha>1$, a is referred to as a discount factor, and the adjusted blank output probability value is:

$$\text{Pr}_{dis}(\emptyset)=\text{Pr}(\emptyset)/\alpha \quad (3)$$

In general, a logarithmic probability is used as a final numerical value to participate in a final decoding score calculation. Therefore, after taking logarithms on both sides of formula (3), it may be obtained that:

$$\log \text{Pr}_{dis}(\emptyset)=\log \text{Pr}(\emptyset)-\log \alpha \quad (4)$$

A result of the above formula (4) may be used as an adjusted probability of the blank output for subsequent decoding.

In some embodiments, the first weight or the second weight is preset in the computer device by a developer or a manager. For example, the first weight or the second weight may be preset in the speech recognition model by the developer.

Step 304: Input, into a decoding map, the phoneme recognition result in which the probability of the blank output satisfies a specified condition in the phoneme recognition results corresponding to the respective speech frames, to obtain a recognition text sequence corresponding to the speech signal.

In some embodiments, the inputting the adjusted phoneme recognition result corresponding to each speech frame into a decoding map to obtain a recognition text sequence corresponding to the speech signal includes:
inputting, when the probability of the blank output in a target phoneme recognition result satisfies a specified condition, the target phoneme recognition result into the decoding map to obtain a recognition text corresponding to the target phoneme recognition result;
the target phoneme recognition result being any one of the phoneme recognition results corresponding to the respective speech frames.

In some embodiments, the specified condition includes:
the probability of the blank output in the target phoneme recognition result being less than a probability threshold.

According to the experiment, it is known that the output of the transducer model has an apparent peak effect compared with that of a DNN-HMM model, that is, the model outputs a certain prediction result with an extremely high confidence at a certain moment. Using the peak effect of the model, the probability of the blank output predicted by the model may be skipped during the decoding process, that is, these probabilities are not involved in the decoding process of the decoding map. Since the present patent uses phonemes as a modeling unit and skips the blank output during decoding, a quantity of steps searched by the decoding map is only related to a quantity of the phonemes, which is referred to as phone synchronous decoding (PSD) in this solution. The following diagram shows an entire process of a PSD algorithm and a blank output weight adjustment proposed in this solution:

TABLE 1

PSD algorithm;

| | | |
|---|---|---|
| Input: | Feature sequence $(x_1, x_2, ..., x_T)$; Blank output weight adjustment coefficient $\beta_{blank}$; Blank output threshold $\gamma_{blank}$; Historical output size (Cov1d lookback) M; Lexicon and grammar (LG) Decoding map; | |
| Output: | Predicted word sequence $w^*$; | |
| 1 | $y_{in}$ = Zeros (M), u = 0, $Q_{posterior}$ = { }, $w^*$ = { } | |
| 2 | Predictor forward calculation $h_0^{pred}$ = Predictor($y_{in}$) | |
| 3 | For all time t: t ← 0 to T − 1 do | |
| 4 | Encoder forward calculation | $h_t^{enc}$ = Encoder($x_t$) |
| 5 | Joint network forward calculation | $p_{t,u}$ = Joint($h_t^{enc}$, $h_{u-1}^{pred}$) |
| 6 | Blank output probability adjustment | $p_{t,u}$(blank) = $p_{t,u}$(blank) * $\beta_{blank}$ |
| 7 | Acquire current prediction | $y_{t,u}$ = arg max ($p_{t,u}$) |
| 8 | IF current prediction is not blank | $y_{t,u}$ ≠ blank; Then |
| 9 | Output counter plus 1 | u = u + 1 |
| 10 | Update predictor input | $y_{in}$ = [$y_{in}$[1:],$y_{t,u}$] |
| 11 | Predictor forward calculation | $h_u^{pred}$ = Predictor($y_{in}$) |
| 12 | End IF | |
| 13 | IF blank output probability is less than threshold $p_{t,u}$(blank) < $\gamma_{blank}$ THEN | |
| 14 | Acoustic model posterior probability entry Enqueue($Q_{posterior}$,$p_{t,u}$) | |
| 15 | LG decoder performs decoding $w_{t,u}$ = WFSTDecoding(LG, $Q_{posterior}$) | |
| 16 | Decoding result entry Enqueue ($w^*$,$w_{t,u}$) | |
| 17 | End IF | |
| 18 | End For | |
| 19 | Return $w^*$ | |

Where, the sixth row in the above algorithm performs weight adjustment, $\beta_{blank}$ in the algorithm is $1/\alpha$ in formula (3), and the 13th to 17th rows in the above algorithm are the PSD algorithm proposed by this solution. That is, a probability distribution of the network output participates in the subsequent decoding of the decoding map only when the probability of the blank output is less than a certain threshold $\Delta_{blank}$.

In some embodiments, the probability threshold is preset in the computer device by a developer or a manager. For example, the probability threshold may be preset in the speech recognition model by the developer.

In some embodiments, before the inputting the adjusted phoneme recognition result corresponding to each speech frame into a decoding map to obtain a recognition text sequence corresponding to the speech signal, the method further includes:

obtaining a threshold influence parameter, the threshold influence parameter including at least one of an ambient sound intensity, a number of times of speech recognition failures in a specified time period, and user setting information; and determining the probability threshold based on the threshold influence parameter.

In an embodiment of the present disclosure, the probability threshold may also be adjusted by the computer device in the process of speech recognition. That is, the computer device may acquire relevant parameters that may affect a value of the probability threshold and flexibly set the probability threshold by the relevant parameters.

For example, the ambient sound intensity may cause interference with a speech emitted by the user, and thus, when the ambient sound intensity is strong, the computer device may set the probability threshold to a greater value, so that more phoneme recognition results are inputted to the decoding map for decoding, thereby ensuring the accuracy of recognition. Conversely, when the ambient sound intensity is weak, the computer device may set the probability threshold to a smaller value, so that more phoneme recognition results are skipped, thereby ensuring the efficiency of recognition.

For another example, the accuracy of decoding the phoneme recognition result based on the decoding map affects a success rate of speech recognition. When there are excessively many speech recognition failures within a specified time period (such as a period of time before the current moment, for example, 5 minutes), the computer device may set the probability threshold to a greater value, so that more phoneme recognition results are inputted into the decoding map for decoding, thereby ensuring the accuracy of recognition. Conversely, when the speech recognition fails less frequently or does not fail within a specified time period, the computer device may set the probability threshold to a smaller value, so that more phoneme recognition results are skipped, thereby ensuring the efficiency of recognition.

In some embodiments, the decoding map is compositely formed by a phoneme lexicon and a language model.

The decoding map used in this solution is a composite of two sub-weighted finite state transducer maps: the phoneme lexicon weighted finite state transducer (WFST) and the language model WFST.

The phoneme lexicon WFST: mapping of Chinese characters or words to a phoneme sequence. A phoneme sequence string is inputted, and this WFST may output corresponding Chinese characters or words. Generally, this WFST is not related to a text domain and is a common part in different recognition tasks.

The language model WFST: This WFST is generally converted from an n-gram language model, and the language model is used to calculate a probability of the occurrence of a sentence, and is obtained by training using training data and a statistical method. Generally, in texts of different domains, such as texts of news and spoken conversations, there are large differences in common words and word-to-word matches, so that when the speech recognition is performed in different domains, adaptation may be implemented by changing the language model WFST.

Figure 7:
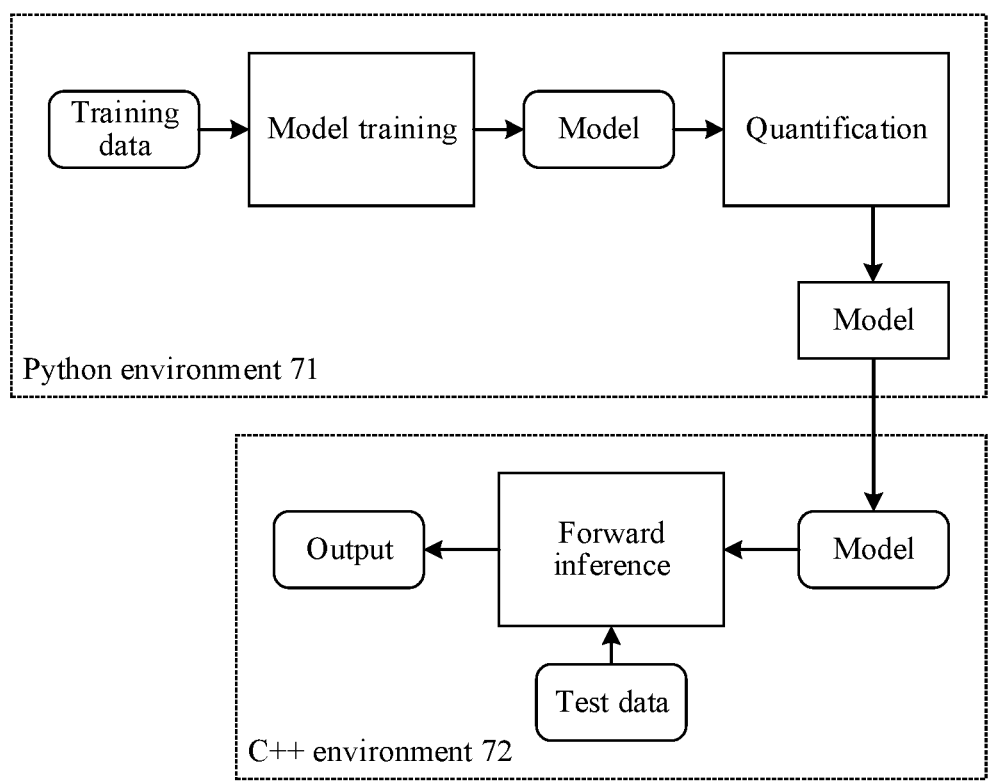
FIG. 7 is a flowchart of model training and application according to the embodiment shown in FIG. 3.

With reference to FIG. 7, FIG. 7 shows a flowchart of model training and application according to an embodiment of the present disclosure. As shown in FIG. 7, taking the application to an in-vehicle device as an example, after the model training shown in the embodiment of the present disclosure is completed, the quantification and deployment of the model are performed using libtorch. An Android version of libtorch uses a QNNPACK library for a matrix calculation of INT8, which greatly accelerates a matrix operation speed. In a Python environment 71, the model is trained using pytorch, and then the model is trained and quantified, that is, the model parameters are quantified as INT8, and a matrix multiplication of INT8 is used to accelerate the calculation. The quantified model is derived and then is used for forward inference of a C++ environment 72 to test through test data.

Through the solution shown in the present disclosure, on the one hand, in a training process of a transducer-based end-to-end model, frame-level alignment information is not required, which greatly simplifies a modeling process. Second, the decoding map is simplified, and a search space is reduced. Speech recognition in related art may need to integrate four sub-WFST for decoding map: H (HMM state), C (context), L (Lexicon) and G (Grammar or Language Model). However, the method proposed in this solution uses phoneme modeling, so the decoding map only needs a composite of L and G, and the search space is greatly reduced. Finally, the use of the phoneme modeling, combined with a custom decoding map, may implement flexible customization requirements. According to different business scenarios, without changing the acoustic model, you only need to customize a language model to adapt to each business scenario thereof.

Compared with an off-line recognition system in the related art, this solution has advantages in both recognition rate and CPU occupancy rate.

In terms of the recognition rate, compared with DNN combined with hidden Markov model (HMM) system model (DNN-HMM model), the system model shown in this solution has achieved a significant improvement.

In terms of CPU occupancy, the system model shown in this solution still has a similar CPU occupancy rate with the DNN-HMM system model when a quantity of model parameters is 4 times that of the DNN-HMM system.

Speech Recognition Rate Comparison:

Table 1 below shows a comparison of character error rates (CER) of the existing DNN-HMM system and the transducer system proposed in this solution over three data sets.

TABLE 1

| Model | Parameter quantity | Test set 1 CER (%) | Test set 2 CER (%) |
| --- | --- | --- | --- |
| DNN-HMM | 0.7M | 14.88 | 19.77 |
| Transducer 1 | 0.8M | 12.1 | 16.09 |
| Transducer 2 | 1.9M | 9.76 | 13.4 |
| Transducer 3 | 2.1M | 8.93 | 13.18 |

It can be seen from Table 1 that the Transducer 1 model respectively achieves decreases of CER relative to 18.7% and 18.6% for the two test sets under similar parameter quantities. In addition, after the quantity of model parameters is increased, character error rates of 8.93% and 13.18% are respectively achieved by using Transducer 3.

CPU occupancy rate comparison:

TABLE 2

| Model | Parameter quantity | CPU occupancy (peak) |
| --- | --- | --- |
| DNN-HMM | 0.7M | 16% |
| Transducer 1 | 0.8M | 18% |
| Transducer 2 | 1.9M | 20% |
| Transducer 3 | 2.1M | 20% |

By comparing Transducer 1 and DNN-HMM in Table 2, a peak of the Transducer model is 2% higher than a peak of the DNN-HMM model when the two models have the same quantity of parameters. However, when the quantity of model parameters is increased, the peak of the Transducer model does not change significantly. Under the condition of significantly increasing the quantity of model parameters and reducing the recognition error rate, the CPU occupancy rate remains at a low level.

In summary, in the solution according to the embodiment of the present disclosure, for the phoneme recognition result including the probability distribution of the speech frame on each phoneme and the blank output, before the phoneme recognition result is inputted into the decoding map, the probability of the blank output in the phoneme recognition result is first suppressed to reduce a probability that the speech frame is recognized as the blank output, thereby reducing the possibility that the speech frame is mistakenly recognized as the blank output, that is, reducing the deletion error of the model, thereby improving the recognition accuracy of the model.

The solution in the embodiment shown in FIG. 3 above in the present disclosure describes using the simultaneous application of blank output weight adjustment (step 303) and decoding skip frame (corresponding step 304) as an example. In other implementations, the blank output weight adjustment and the decoding skip frame may also be applied independently. For example, in an exemplary embodiment of the present disclosure, when the decoding skip frame is applied independently, the solution shown in the present disclosure may be as follows:

acquiring a speech signal, the speech signal including each speech frame obtained by segmentation of an original speech;

performing phoneme recognition on the speech signal to obtain a phoneme recognition result corresponding to each speech frame, the phoneme recognition result indicating a probability distribution of the corresponding speech frame in a phoneme space, and the phoneme space including each phoneme and a blank output; and inputting, into a decoding map, the phoneme recognition result in which the probability of the blank output satisfies a specified condition in the phoneme recognition results corresponding to the respective speech frames, to obtain a recognition text sequence corresponding to the speech signal.

In summary, in the solution according to the embodiment of the present disclosure, for the phoneme recognition result including the probability distribution of the speech frame on each phoneme and the blank output, when the phoneme recognition result is inputted into the decoding map, the phoneme recognition result in which the probability of the blank output satisfies the condition may be decoded, which reduces a quantity of phoneme recognition results that need to be decoded, and skips unnecessary decoding steps, thereby effectively improving the speech recognition efficiency.

Figure 8:
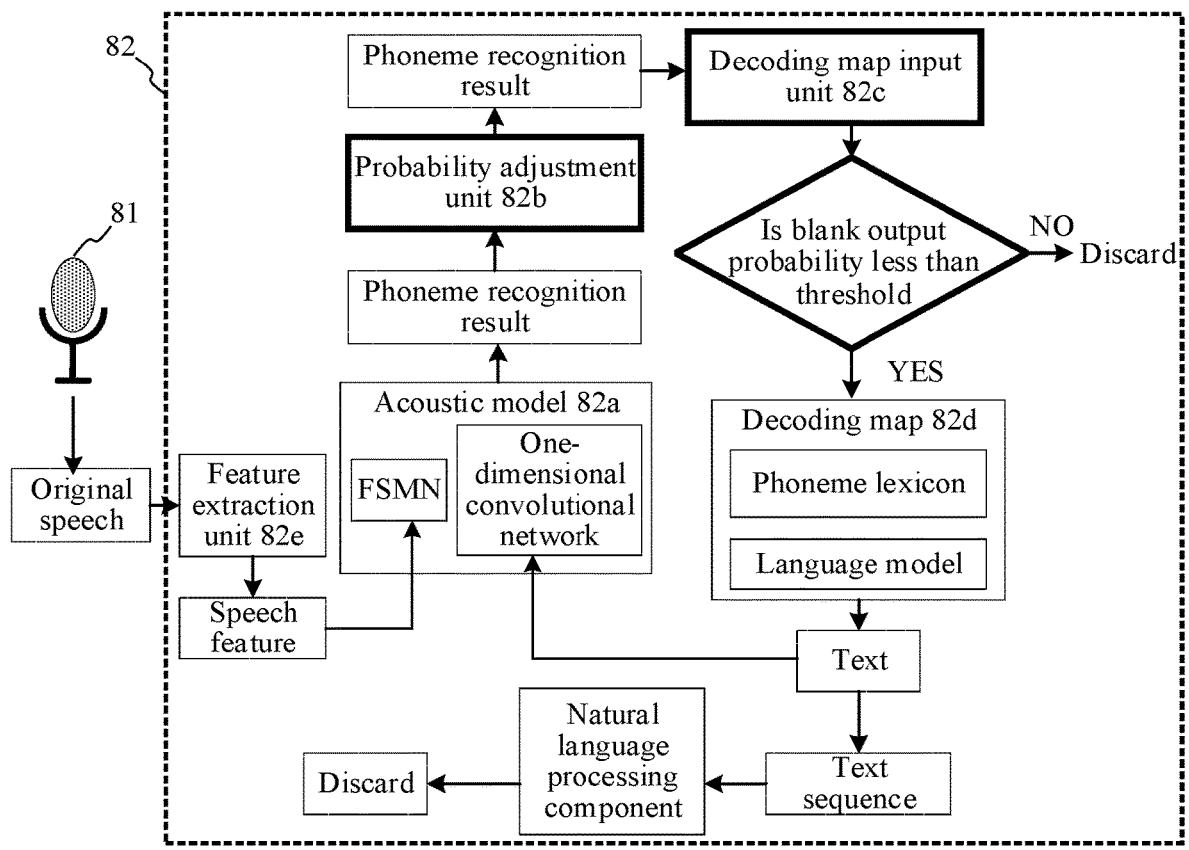
FIG. 8 is a framework diagram of a speech recognition system according to an exemplary embodiment.

With reference to FIG. 8, FIG. 8 is a framework diagram of a speech recognition system according to an exemplary embodiment. As shown in FIG. 8, an audio collection device 81 is connected to a speech recognition device 82, and the speech recognition device 82 includes an acoustic model 82a, a probability adjustment unit 82b, a decoding map input unit 82c, a decoding map 82d, and a feature extraction unit 82e. The decoding map 82d is formed by a phoneme lexicon and a language model.

In an application process, the audio collection device 81 collects an original speech of the user, and then transmits the original speech to the feature extraction unit 82e in the speech recognition device 82. The feature extraction unit divides the original speech and performs feature extraction on each speech frame. A speech feature of a speech frame, and phonemes of a text recognized by the decoding map 82d on the first four non-empty speech frames of the speech frame are respectively inputted into the FSMN and the one-dimensional convolutional network in the acoustic model 82*a*, to obtain a phoneme recognition result of the speech frame outputted from the acoustic model 82*a*.

The phoneme recognition result is inputted to the probability adjustment unit 82*b* to adjust the probability of the blank output and obtain an adjusted phoneme recognition result. The adjusted phoneme recognition result is judged by the decoding map input unit 82*c*. When it is judged that the probability of the blank output after adjustment is less than a threshold, the decoding is determined to be necessary, and the decoding map input unit 82*c* inputs the adjusted phoneme recognition result into the decoding map 82*d*, and the decoding map 82*d* recognizes a text. Conversely, if it is judged that the probability of the blank output after adjustment is not less than a threshold, the decoding is determined to be not necessary, and the adjusted phoneme recognition result is discarded.

The decoding map recognizes the adjusted phoneme recognition result of each speech frame, and outputs a text sequence. Then, the text sequence may be outputted to a natural language processing component, and the natural language processing component responds to the speech inputted by the user.

Figure 9:
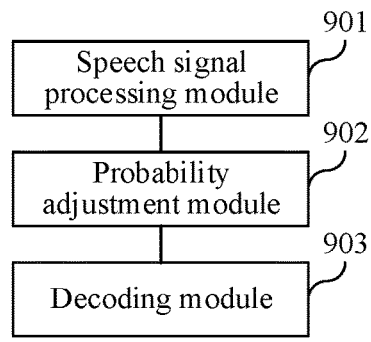
FIG. 9 is a structural block diagram of a speech recognition apparatus according to an exemplary embodiment.

FIG. 9 is a structural block diagram of a speech recognition apparatus according to an exemplary embodiment. The speech recognition apparatus may implement all or part of the steps in the method according to the embodiment shown in FIG. 2 or FIG. 3. The speech recognition apparatus may include:

a speech signal processing module 901, configured to perform phoneme recognition on a speech signal to obtain a phoneme recognition result corresponding to each speech frame in the speech signal, the phoneme recognition result indicating a probability distribution of the corresponding speech frame in a phoneme space, and the phoneme space including each phoneme and a blank output;

a probability adjustment module 902, configured to perform suppression adjustment on a probability of the blank output in the phoneme recognition result corresponding to each speech frame, so as to reduce a ratio of the probability of the blank output to a probability of each phoneme in the phoneme recognition result; and a decoding module 903, configured to input the adjusted phoneme recognition result corresponding to each speech frame into a decoding map to obtain a recognition text sequence corresponding to the speech signal, the decoding map including a mapping relationship between characters and phonemes.

In some embodiments, the probability adjustment module 902 is configured to adjust the phoneme recognition result corresponding to each speech frame by at least one of the following adjustment methods: reducing the probability of the blank output in the phoneme recognition result corresponding to a speech frame; or improving the probability of each phoneme in the phoneme recognition result corresponding to a speech frame.

In some embodiments, the probability adjustment module 902 is configured to multiply the probability of the blank output in the phoneme recognition result corresponding to a speech frame by a first weight, the first weight being less than 1 and greater than 0.

In some embodiments, the probability adjustment module 902 is configured to multiply the probability of each phoneme in the phoneme recognition result corresponding to each speech frame by a second weight, the second weight being greater than 1.

In some embodiment, the decoding module 903 is configured to:

input, when the probability of the blank output in a target phoneme recognition result satisfies a specified condition, the target phoneme recognition result into the decoding map to obtain a recognition text corresponding to the target phoneme recognition result, the target phoneme recognition result being any one of the phoneme recognition results corresponding to the respective speech frames.

In some embodiments, the specified condition includes:

the probability of the blank output in the target phoneme recognition result being less than a probability threshold.

In some embodiments, the apparatus further includes:

a parameter acquiring module, configured to obtain a threshold influence parameter, the threshold influence parameter including at least one of an ambient sound intensity, a number of times of speech recognition failures in a specified time period, and user setting information; and a threshold determination module, configured to determine the probability threshold based on the threshold influence parameter.

In some embodiment, the speech signal processing module 901 is configured to:

perform a feature extraction on a target speech frame by a trained acoustic model to obtain a feature vector of the target speech frame, the target speech frame being any one of the respective speech frames;

input the target speech frame into an encoder in the acoustic model to obtain an acoustic hidden layer representation vector of the target speech frame; and input phoneme information of a historical recognition text of the target speech frame into a predictor in the acoustic model to obtain a text hidden layer representation vector of the target speech frame, the historical recognition text of the target speech frame being a text obtained by recognizing phoneme recognition results of first n non-blank output speech frames of the target speech frame by the decoding map, and n being an integer greater than or equal to 1; and input the acoustic hidden layer representation vector of the target speech frame and the text hidden layer representation vector of the target speech frame into a joint network to obtain the phoneme recognition result of the target speech frame.

In some embodiments, the encoder is a forward sequence memory network (FSMN).

In some embodiments, the predictor is a one-dimensional convolutional network.

In some embodiments, the decoding map is compositely formed by a phoneme lexicon and a language model.

In summary, in the solution according to the embodiment of the present disclosure, for the phoneme recognition result including the probability distribution of the speech frame on each phoneme and the blank output, before the phoneme recognition result is inputted into the decoding map, the probability of the blank output in the phoneme recognition result is first suppressed to reduce a probability that the speech frame is recognized as the blank output, thereby reducing the possibility that the speech frame is mistakenly recognized as the blank output, that is, reducing the deletion error of the model, thereby improving the recognition accuracy of the model.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 10:
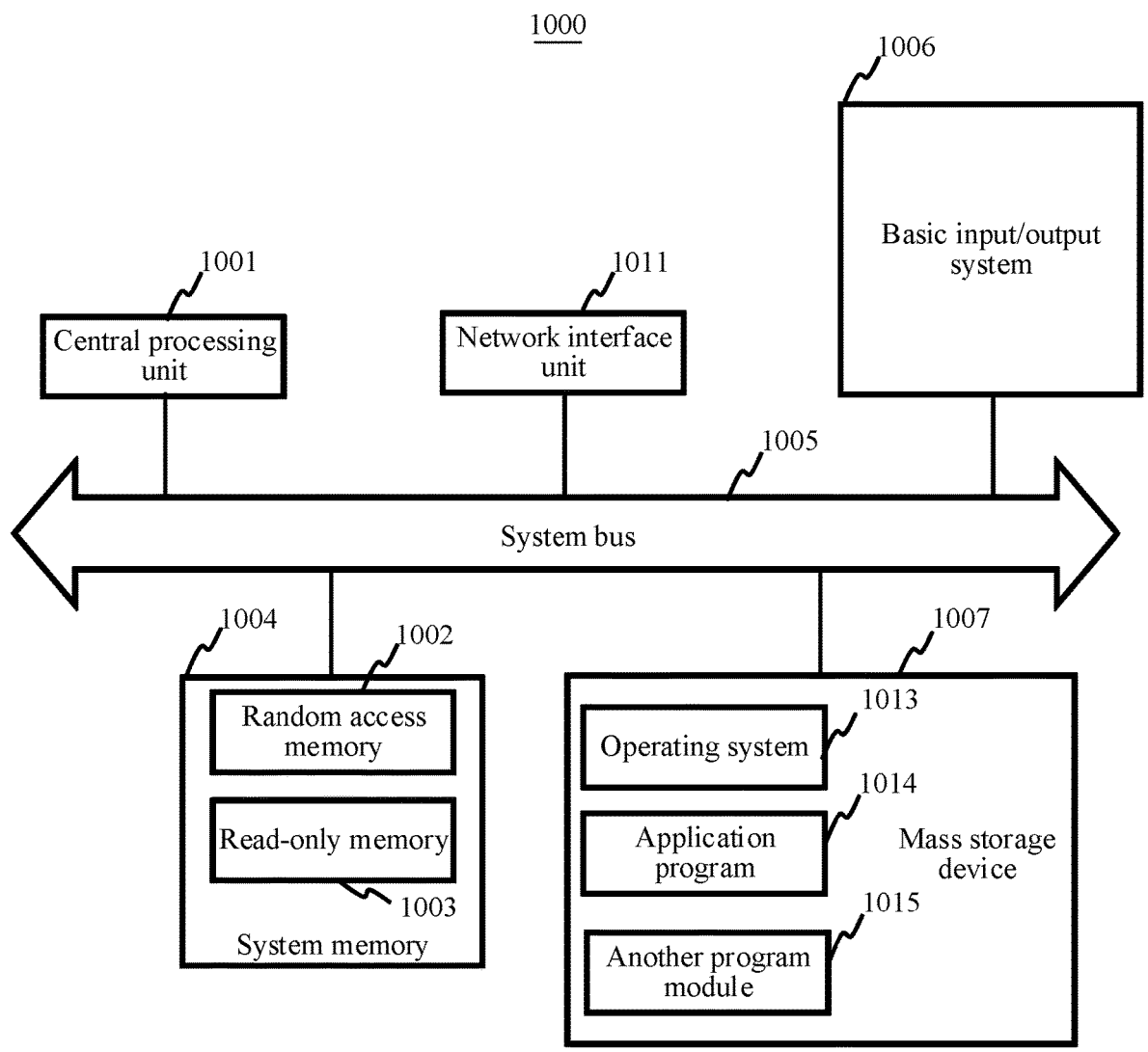
FIG. 10 is a structural block diagram of a computer device according to an exemplary embodiment.

FIG. 10 is a schematic structural diagram of a computer device according to an exemplary embodiment. The computer device may be implemented as the computer device in the embodiment of each method described above. A computer device 1000 includes a central processing unit 1001, a system memory 1004 including a random access memory (RAM) 1002 and a read-only memory (ROM) 1003, and a system bus 1005 connecting the system memory 1004 and the central processing unit 1001. The computer device 1000 further includes a basic input/output system 1006 configured to transmit information between components in the computer, and a mass storage device 1007 configured to store an operating system 1013, an application program 1014, and another program module 1015.

The mass storage device 1007 is connected to the central processing unit 1001 by using a mass storage controller (not shown) connected to the system bus 1005. The mass storage device 1007 and an associated computer-readable medium provide non-volatile storage for the computer device 1000. That is, the mass storage device 1007 may include a computer-readable medium (not shown) such as a hard disk or a compact disc read-only memory (CD-ROM) drive.

Without loss of generality, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, a flash memory, or other solid-state storage technology, a CD-ROM, or other optical storage, a magnetic cassette, a magnetic tape, a magnetic disk storage, or other magnetic storage device. Certainly, it may be known by a person skilled in the art that the computer storage medium is not limited to the foregoing several types. The system memory 1004 and the mass storage device 1007 may be collectively referred to as a memory.

The computer device 1000 may be connected to the Internet or another network device by using a network interface unit 1011 connected to the system bus 1005.

The memory further includes at least one computer instruction. The at least one computer instruction is stored in the memory. A processor implements all or part of the steps of the method shown in FIG. 2 or FIG. 3 by loading and executing the at least one computer instruction.

In an exemplary embodiment, a non-temporary computer-readable storage medium including an instruction, for example, a memory including a computer program (an instruction), is further provided, and the program (instruction) may be executed by a processor of a computer device to complete the method according to each embodiment of the present disclosure. For example, the non-temporary computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to execute the method according to each embodiment.

A computer program product includes a computer program, and the computer program, when executed by a processor, implementing the method according to each embodiment.

After considering the specification and practicing the present disclosure, a person skilled in the art may easily conceive of other implementations of the present disclosure. The present disclosure is intended to cover any variations, uses, or adaptive changes of the present disclosure following the general principles of the present disclosure, and includes well-known knowledge and conventional technical means in the art and undisclosed in the present disclosure. The specification and the embodiments are merely considered as examples, and the actual scope and the spirit of the present disclosure are stated in the claims.

The present disclosure is not limited to the accurate structures that are described above and that are shown in the accompanying drawings, and modifications and changes may be made without departing from the scope of the present disclosure. The scope of the present disclosure is limited by the appended claims only.

What is claimed is:

1. A speech recognition method, executed by a computer device, the method comprising:
   performing phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output;
   performing suppression adjustment on a probability of the blank output in the phoneme recognition result corresponding to the speech frame, to reduce a ratio of the probability of the blank output to a probability of a phoneme in the phoneme recognition result;
   determining a probability threshold based on at least one of an ambient sound intensity, a number of times of speech recognition failures in a specified time period, or user setting information; and
   inputting the adjusted phoneme recognition result corresponding to the speech frame into a decoding map to obtain a recognition text sequence corresponding to the speech signal, the decoding map comprising a mapping relationship between characters and phonemes, wherein the inputting the adjusted phoneme recognition result corresponding to the speech frame into a decoding map to obtain a recognition text sequence corresponding to the speech signal comprises:
      inputting, when the probability of the blank output in the target phoneme recognition result is less than the probability threshold, the target phoneme recognition result into the decoding map to obtain a recognition text corresponding to the target phoneme recognition result, the target phoneme recognition result being one of phoneme recognition results corresponding to speech frames of the speech signal.

2. The method according to claim 1, wherein the performing suppression adjustment on a probability of the blank output in the phoneme recognition result corresponding to the speech frame comprises:
increasing the probability of the phoneme in the phoneme recognition result corresponding to the speech frame.

3. The method according to claim 1, wherein the decoding map is compositely formed by a phoneme lexicon and a language model.

4. The speech recognition method according to claim 1, wherein the probability threshold is determined based on at least the ambient sound intensity, and a greater ambient sound intensity is associated with a higher probability threshold.

5. The speech recognition method according to claim 1, wherein the probability threshold is determined based on at least the number of times of speech recognition failures in the specified time period, and a greater number of speech recognition failures in the specified time period is associated with a higher probability threshold.

6. The method according to claim 1, wherein the performing suppression adjustment on a probability of the blank output in the phoneme recognition result corresponding to the speech frame comprises:
reducing the probability of the blank output in the phoneme recognition result corresponding to the speech frame.

7. The method according to claim 6, wherein the reducing the probability of the blank output in the phoneme recognition result corresponding to the speech frame comprises:
multiplying the probability of the blank output in the phoneme recognition result corresponding to the speech frame by a first weight, the first weight being less than 1 and greater than 0.

8. The method according to claim 6, wherein the reducing the probability of the blank output in the phoneme recognition result corresponding to the speech frame comprises:
multiplying the probability of the phoneme in the phoneme recognition result corresponding to the speech frame by a second weight, the second weight being greater than 1.

9. The method according to claim 1, wherein the performing phoneme recognition on a speech signal to obtain a phoneme recognition result corresponding to the speech frame in the speech signal comprises:
performing a feature extraction on a target speech frame by a trained acoustic model to obtain a feature vector of the target speech frame, the target speech frame being one of speech frames of the speech signal;
inputting the target speech frame into an encoder in the acoustic model to obtain an acoustic hidden layer representation vector of the target speech frame;
inputting phoneme information of a historical recognition text of the target speech frame into a predictor in the acoustic model to obtain a text hidden layer representation vector of the target speech frame, the historical recognition text of the target speech frame being a text obtained by recognizing phoneme recognition results of first n non-blank output speech frames of the target speech frame by the decoding map, and n being an integer greater than or equal to 1; and
inputting the acoustic hidden layer representation vector of the target speech frame and the text hidden layer representation vector of the target speech frame into a joint network in the acoustic model to obtain the phoneme recognition result of the target speech frame.

10. The method according to claim 9, wherein the encoder is a forward sequence memory network (FSMN).

11. The method according to claim 9, wherein the predictor is a one-dimensional convolutional network.

12. A speech recognition apparatus, comprising:
a processor and a memory, the memory storing at least one computer instruction, and the at least one computer instruction being loaded and executed by the processor to implement:
performing phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output;
performing suppression adjustment on a probability of the blank output in the phoneme recognition result corresponding to the speech frame, to reduce a ratio of the probability of the blank output to a probability of a phoneme in the phoneme recognition result;
determining a probability threshold based on at least one of an ambient sound intensity, a number of times of speech recognition failures in a specified time period, or user setting information; and
inputting the adjusted phoneme recognition result corresponding to the speech frame into a decoding map to obtain a recognition text sequence corresponding to the speech signal, the decoding map comprising a mapping relationship between characters and phonemes, wherein the inputting the adjusted phoneme recognition result corresponding to the speech frame into a decoding map to obtain a recognition text sequence corresponding to the speech signal comprises:
inputting, when the probability of the blank output in the target phoneme recognition result is less than the probability threshold, the target phoneme recognition result into the decoding map to obtain a recognition text corresponding to the target phoneme recognition result, the target phoneme recognition result being one of phoneme recognition results corresponding to speech frames of the speech signal.

13. The apparatus according to claim 12, wherein the performing suppression adjustment on a probability of the blank output in the phoneme recognition result corresponding to the speech frame comprises:
increasing the probability of the phoneme in the phoneme recognition result corresponding to the speech frame.

14. The apparatus according to claim 12, wherein the performing suppression adjustment on a probability of the blank output in the phoneme recognition result corresponding to the speech frame comprises:
reducing the probability of the blank output in the phoneme recognition result corresponding to the speech frame.

15. The apparatus according to claim 14, wherein the reducing the probability of the blank output in the phoneme recognition result corresponding to the speech frame comprises:
multiplying the probability of the blank output in the phoneme recognition result corresponding to the speech frame by a first weight, the first weight being less than 1 and greater than 0.

16. The apparatus according to claim 14, wherein the reducing the probability of the blank output in the phoneme recognition result corresponding to the speech frame comprises:

multiplying the probability of the phoneme in the phoneme recognition result corresponding to the speech frame by a second weight, the second weight being greater than 1.

17. A non-transitory computer-readable storage medium, storing at least one computer instruction, the at least one computer instruction being loaded and executed by a processor to implement:

performing phoneme recognition on a speech signal to obtain a phoneme recognition result corresponding to a speech frame in the speech signal, the phoneme recognition result indicating a probability distribution of the corresponding speech frame in a phoneme space, and the phoneme space comprising a plurality of phonemes and a blank output;

performing suppression adjustment on a probability of the blank output in the phoneme recognition result corresponding to the speech frame, to reduce a ratio of the probability of the blank output to a probability of a phoneme in the phoneme recognition result;

determining a probability threshold based on at least one of an ambient sound intensity, a number of times of speech recognition failures in a specified time period, or user setting information; and inputting the adjusted phoneme recognition result corresponding to the speech frame into a decoding map to obtain a recognition text sequence corresponding to the speech signal, the decoding map comprising a mapping relationship between characters and phonemes, wherein the inputting the adjusted phoneme recognition result corresponding to the speech frame into a decoding map to obtain a recognition text sequence corresponding to the speech signal comprises:

inputting, when the probability of the blank output in the target phoneme recognition result is less than the probability threshold, the target phoneme recognition result into the decoding map to obtain a recognition text corresponding to the target phoneme recognition result, the target phoneme recognition result being one of phoneme recognition results corresponding to speech frames of the speech signal.

* * * * *